No. 867,969. PATENTED OCT. 15, 1907.
P. G. GRIFFITH.
APPARATUS FOR USE IN PURIFYING WATER AND OTHER LIQUIDS.
APPLICATION FILED DEC. 30, 1905.

3 SHEETS—SHEET 1.

Witnesses
Inventor

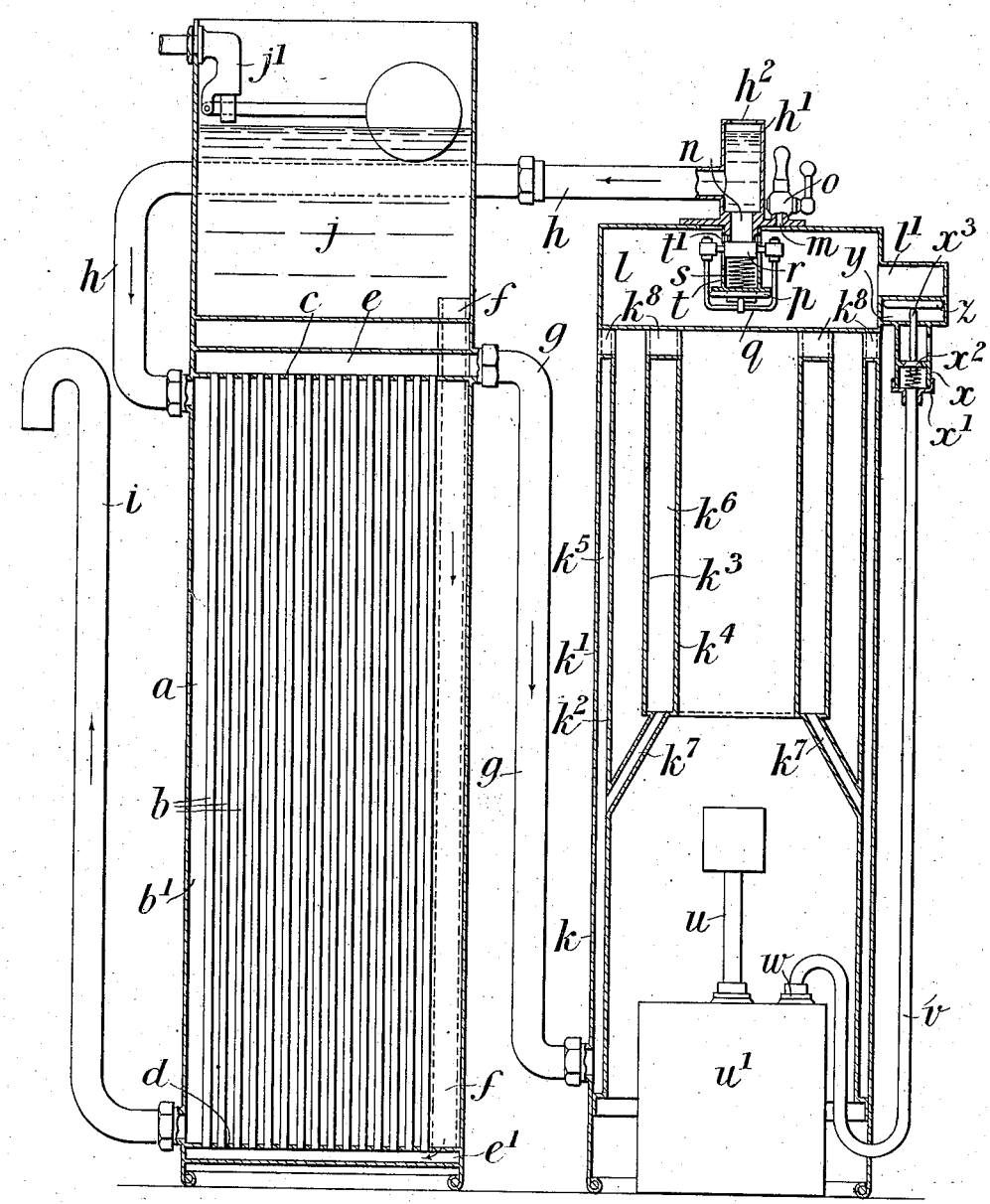

No. 867,969. PATENTED OCT. 15, 1907.
P. G. GRIFFITH.
APPARATUS FOR USE IN PURIFYING WATER AND OTHER LIQUIDS.
APPLICATION FILED DEC. 30, 1905.
3 SHEETS—SHEET 3.
Fig. 4. 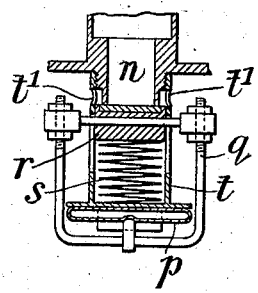 Fig. 5. 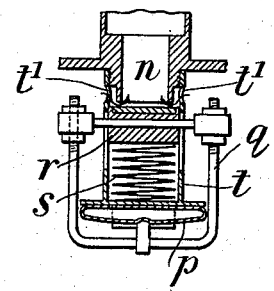
Fig. 6.
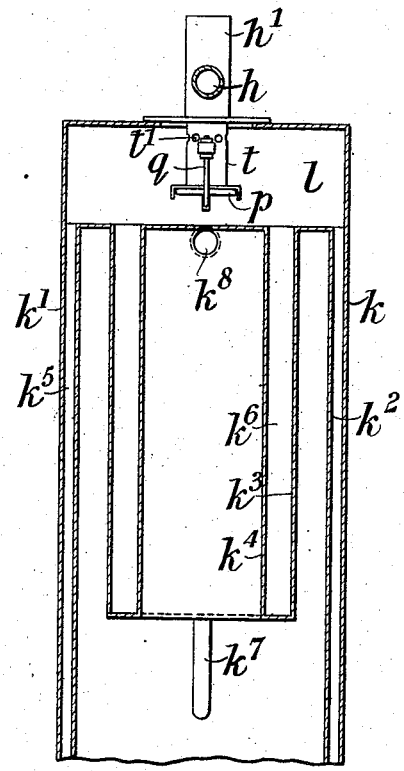
Witnesses 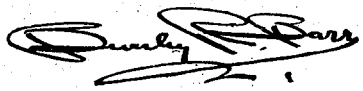
Inventor
Patrick Gill Griffith
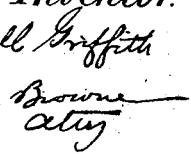

UNITED STATES PATENT OFFICE.

PATRICK GILL GRIFFITH, OF LONDON, ENGLAND.

APPARATUS FOR USE IN PURIFYING WATER AND OTHER LIQUIDS.

No. 867,969.  Specification of Letters Patent.  Patented Oct. 15, 1907.

Application filed December 30, 1905. Serial No. 293,987.

*To all whom it may concern:*

Be it known that I, PATRICK GILL GRIFFITH, a subject of the King of Great Britain, residing at Villa Molitor, 636 Green Lanes, London, England, have invented a new and useful Apparatus for Use in Purifying Water and other Liquids, of which the following is a specification.

This invention relates to apparatus more particularly designed for use in purifying water and other liquid by raising it to a temperature of sixty-five degrees centigrade to eighty-five degrees centigrade for a period not exceeding twenty-five seconds, whereby living pathogenic organisms such as may commonly exist and be conveyed by the liquid are killed.

Figure 1:
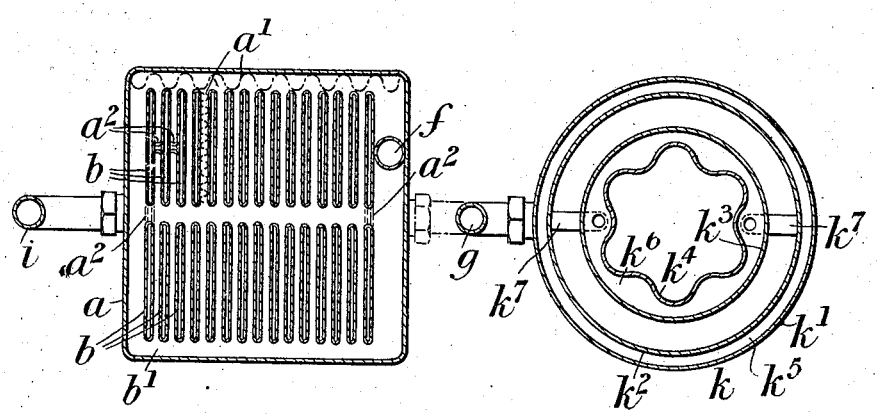
Figure 3:
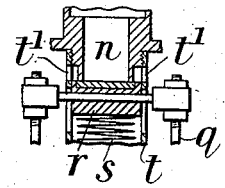

In the accompanying drawings, Figure 1 is a horizontal section of apparatus constructed according to this invention for purifying water and other liquids. Fig. 2 is a vertical section thereof. Fig. 3 is an enlarged detail of the thermostatically controlled discharge valve. Fig. 4 is a detail section of the discharge valve and actuating capsule, showing the valve closed. Fig. 5 is a section similar to Fig. 4 but showing the valve open. Fig. 6 is a section of a portion of the heating apparatus, the same being in a plane at right-angles to that of Fig. 2.

According to this invention there is provided a cooling tank or chamber $a$ of suitable dimensions containing a series of vertically arranged flattened tubes $b$, $b$ which may be secured by solder or other suitable means to the upper and lower walls $c$, $d$ of the chamber $a$. The said walls are perforated to allow the tubes $b$ to open into heads $e$, $e^1$ situated exteriorly to the said chamber, the latter being preferably of such size that the space which surrounds the flattened tubes is of the same, or nearly the same, capacity as that of the total capacity of the tubes. The tubes $b$ and the surrounding space in the chamber may be packed with corrugated sheets of copper or other suitable metal as indicated at $a^1$, Fig. 1, which sheets serve the purpose of conveying heat from the liquid in the tubes to that contained in the said surrounding space or vice versa. In some cases the tubes $b$ which are shown as arranged in two rows may be connected as indicated by the dotted lines $a^2$ in Fig. 1 so as to constitute one complete passage having corrugated walls, the adjacent tubes of each row being connected together at the center and the adjacent end tubes in the two rows also connected as shown.

The heads $e$, $e^1$ are respectively provided with inlet and outlet apertures, nozzles or tubes $f$, $g$ whereby liquid is conveyed to and carried from the flattened tubes. The space $b^1$ which surrounds the tubes $b$ is similarly provided with inlet and outlet pipes $h$, $i$ respectively at opposite ends. The water or other liquid to be treated is conducted to the tubes $b$ by means of the pipe $f$ which is in communication with a reservoir $j$ situated at a higher level and controlled by a float valve $j^1$, this constituting a convenient way for supplying liquid under pressure to the apparatus.

Connected with the series of flattened tubes $b$ by the pipe $g$ is a heater $k$ which may consist of one, or more hollow cylinders arranged, in the latter case, concentrically and, in either case, vertically, through which the treated liquid is caused to flow. In the drawings the heater is shown as consisting of four hollow cylinders $k^1$, $k^2$, $k^3$, $k^4$ forming two concentric water spaces $k^5$, $k^6$ connected at the lower part by tubes $k^7$. One or more of these cylinders may be deeply corrugated in the interior, for instance, the cylinder $k^4$, as shown, the prominences pertaining to the corrugations extending for, say, half an inch from the general level of the internal surface of the cylinder and the said corrugations being preferably disposed in a vertical direction. The spaces between the cylinders $k^2$, $k^3$ and in the interior of the cylinder $k^4$ form the heating spaces having discharge openings $k^8$.

The heater is further provided at its highest part with a receptacle $l$ into which the water or other liquid, heated in the cylinder or cylinders flows, as illustrated in Fig. 6. This receptacle $l$ is provided with two outlets $m$, $n$, the former of which, opened by means of a valve or cock $o$, allows of the escape of air and of the hot liquid being drawn off if desired and the latter of which forms the entrance to the pipe $h$ and is controlled by a regulator constructed as follows, that is to say, a capsule or expansible receptacle or chamber $p$, preferably disk shaped, containing a liquid which boils at a predetermined temperature is adapted to operate through a stirrup $q$, or other suitable connection, a stopper or valve $r$ which normally closes the aforesaid opening $n$, the said valve being subjected to the action of a closing spring $s$ or its equivalent. The spring and valve are contained in an open box or chamber $t$ arranged adjacent to the opening $n$ and having perforations $t^1$. The thermostatic capsule is wholly surrounded by the hot water in chamber $l$.

The heated liquid which escapes past the regulator is conducted to the cooling tank or receptacle $a$ and enters this, at the end opposite to that at which the cold liquid is supplied, by the pipe $h$ pertaining to the space surrounding the flattened tubes. The portion of the pipe $h$ containing the opening $n$ is provided with an upward branch $h^1$ having an opening $h^2$ for the escape of any steam that may be formed. This opening $h^2$ is above the level of the water in the reservoir $j$. The liquid after passing through the tank $a$ is drawn off by means of the pipe or tube $i$ from the space $b^1$ surrounding the flattened tubes, this drawing off tube being carried to a point higher than the inlet from the heater in order to insure that the tank is always full of liquid.

Heat may be applied to the heater by means of a petroleum vapor lamp $u$ or by other means.

The operation of the apparatus is as follows. Assume the water or other liquid to be treated to have passed from the reservoir $j$ through the pipe $f$, the head $e^1$, the tubes $b$, the head $e$ and the pipe $g$ into the heater $k$ until the latter is full, the cock $o$ being opened to allow of the escape of the air contained in the heater as the water flows therein. The cock $o$ is then closed and the lamp $u$ or other heating device lighted to heat the water or the like in the heater. When the said water reaches the temperature at which the liquid in the capsule boils, the latter is expanded and opens the valve $r$ which allows the heated water to flow through the pipe $h$ into the space $b^1$ surrounding the tubes $b$, the said water parting with its heat by contact with the said tubes and warming the water in the latter, it then flowing away through the pipe $i$ for use. As the heated water leaves the top of the heater, warm water flows therein at the bottom from the tubes $b$ by means of the pipe $g$, the said tubes $b$ being charged with a further supply of cold water from the reservoir $j$. It will thus be seen that a continuous supply of the treated water or the like can be maintained, the warm water entering he heater passing upward therein and becoming heated by contact with the interior walls thereof and finally passing away through the valve $r$. It will further be seen that the time during which the liquid is subjected to the heat required for destroying the micro-organisms is dependent upon the capacity of the chamber $l$ of the heater.

Where a petroleum vapor lamp is employed of the well known type in which the oil is forced by air pressure in the reservoir to the burner or vaporizer, it may be provided with means for extinguishing it should the supply of water be insufficient or fail. This extinguisher may be constructed as follows. A piece of metal tubing $v$ of small diameter and suitable length is attached at one end, by a fixed or movable air tight joint, to the reservoir $u^1$ of the lamp. The connection is preferably made with the cap $w$ of the opening through which the reservoir is filled with oil so that by unscrewing the said cap the remainder of the lamp may be removed. The metal tubing $v$ terminates at the other end in a small metallic box $x$ provided with an air-tight screw cap $x^1$ and an opening closed by a conical valve $x^2$ provided with a small spindle $x^3$ projecting outside the box. This valve opens inwards, and, when air is forced into the reservoir $u^1$ of the lamp, is pressed against its seating and prevents the escape of the said air. The box $x$ is attached to a metal chamber $y$ fastened on an extension $l^1$ of the chamber $l$ of the water heater, in such a way, that the spindle $x^3$ of the valve projects into the chamber $y$. This chamber contains a metallic capsule $z$ similar to the capsule $p$. When the liquid in the capsule $z$ boils, the capsule expands and presses on he spindle $x^3$ of the valve $x^2$, which is pushed inwards and consequently out of contact with its seating. The air under pressure in the reservoir $u^1$ of the lamp is thus allowed to escape, and the lamp consequently extinguished. The choice of a liquid for the capsule depends on the highest temperature the stream of water or other liquid is heated to when the water heater is in use. When this is below 100° C. a capsule containing distilled water may be selected, or one containing a liquid that boils at a lower temperature provided that its boiling point is above the highest temperature of the water or other liquid heated.

I claim:—

An apparatus for use in purifying water and other liquid having, in combination, a heated liquid chamber, a discharge valve from said chamber which opens to permit outflow of the heated liquid when said liquid reaches a predetermined temperature between sixty-five and eighty-five degrees centigrade, and a closed expansible metallic capsule operatively connected with said valve and containing a liquid which boils at said predetermined temperature and thereby expands the capsule to open said valve, said capsule being located within said chamber and wholly surrounded by the hot liquid therein.

In witness whereof I have hereunto set my hand in presence of two witnesses.

PATRICK GILL GRIFFITH.

Witnesses:
MARY HILL,
F. G. HAWTIN.